United States Patent
Ikeda et al.

(10) Patent No.: US 6,984,782 B2
(45) Date of Patent: Jan. 10, 2006

(54) CABLE AND THE LIKE PROTECTION AND GUIDE DEVICE

(75) Inventors: Masaaki Ikeda, Osaka (JP); Shoichiro Komiya, Osaka (JP); Takayuki Matsuda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 142 days.

(21) Appl. No.: 10/823,958

(22) Filed: Apr. 14, 2004

(65) Prior Publication Data

US 2004/0222002 A1 Nov. 11, 2004

(30) Foreign Application Priority Data

May 7, 2003 (JP) ........................................ 2003-129240

(51) Int. Cl.
  *F16G 3/04* (2006.01)

(52) U.S. Cl. .................... 174/21 JS; 174/68.1; 59/78.1
(58) Field of Classification Search ................ 174/68.1, 174/74 A, 21 JS, 19; 59/78.1, 900; 248/49, 248/51

See application file for complete search history.

(56) References Cited

U.S. PATENT DOCUMENTS

| 4,384,594 A | * | 5/1983 | Moritz ........................ 138/120 |
| RE35,579 E | * | 8/1997 | Moritz et al. ................ 59/78.1 |
| 2004/0112625 A1 | * | 6/2004 | Sheikholeslami et al. .. 174/68.1 |

FOREIGN PATENT DOCUMENTS

| JP | 2548610 | 8/1966 |
| JP | HEI 9-177902 | 7/1997 |

* cited by examiner

*Primary Examiner*—Chau N. Nguyen
(74) *Attorney, Agent, or Firm*—Woodling, Krost and Rust (57) ABSTRACT

A cable and the like protection and guide device, which can prevent the rub-damage of the cable(s) and the like even if the device is operated at high speed and high frequency is disclosed. A number of link bodies (11) are articulably connected to each other in the longitudinal direction with the cables and the like (12, 112, 113) inserted thereinto. Each of the link bodies comprises a pair of side plates (21) disposed on both sides of the cables and the like and the connecting rods (22, 23) respectively spanned across the bending outer circumferential side and the bending inner circumferential side. Further cable protecting sheets (31, 32) are inserted along the longitudinal line of the cable and the like on at least one of the bending outer circumferential side and the bending inner circumferential side.

3 Claims, 5 Drawing Sheets

CABLE AND THE LIKE PROTECTION AND GUIDE DEVICE

This patent application includes a claim of foreign priority to prior filed Japanese Patent Application 2003-129240 filed May 7, 2003.

1. Technical Field to Which the Invention Pertains

The present invention relates to a cable and the like protection and guide device, and more specifically relates to a device suitable for accommodates a cable and the like such as cable(s) or hose(s), which supplies a movable member of a machine tool electric power or energy of compression air and guiding and supporting the cable and the like stably and reliably during the movement of the movable portion.

2. Related Art

As such a cable and the like protection and guide device, a device has been known which has link bodies each having a pair of side plates and connecting rods spanned across said side plates on an outer circumferential side and an inner circumferential side and in which said link bodies are pin-connected to each other adjacent link bodies and are articulable about pins. Each link body includes a vertical partitioning member and a lateral partitioning member. The vertical partitioning member is disposed so as to span across the connecting rods and is fixed thereto. The lateral partitioning member is disposed so as to span across the side plates and vertical partitioning members, and the vertical partitioning members, respectively, and is fixed thereto. A cable and the like are inserted into a an accommodation space, which is formed in link bodies by these vertical partitioning member and lateral partitioning member, and are not rubbed between each other (see for example Patent Reference 1).

As another cable and the like protection and guide device a device has been known in which chain unit members are connected to each other by elastic connecting members. Each chain unit member is composed of a hollow member. A belt-shaped elastic connecting member is penetrated into the chain unit member, and is connected to a supporting plate on a bending side of the chain unit member. This elastic connecting member is made of an elastomer resin or a synthetic resin, and the chain unit members are mutually bent or articulated by their flexion (see for example Patent Reference 2).

Patent Reference 1. The specification of Japanese Patent No. 2548610.

Patent Reference 2. Japanese Laid-Open Patent Publication No. Hei. 9-177902.

U.S. Pat. No. 3,157,491 specification.

Problems to be Solved by the Invention

However, in a conventional cable and the like protection and guide device described in Patent Reference 1, relative displacement, rubbing and entanglement are induced between the respective connecting rods on the bending outer and inner circumferential sides or partitioning members and the cable and the like by polygonal motion of mutual side plates and difference in arc lengths between bending outer circumferential side and bending inner circumferential side in the cable accommodation space, during the traveling of the cable and the like. As a result the cable and the like had the possibility of rub damage. Further, in the conventional cable and the like protection and guide device, since each connecting rod of the bending outer and inner circumferential sides and the lateral partitioning member in each link body are disposed at regular intervals in the longitudinal direction of each link body, when the link bodies are bent or articulated or in a linear state, the cable and the like are bent and are liable to be damaged. At the same time, since the cable and the like and the respective connecting rods and lateral partitioning members are locally slid therebetween so that the contact surface pressure is increased, the cable and the like are liable to be rub damaged. Particularly, in a case where the cable and the like protection and guide device is operated at high speed and high frequency, there were problems that said rubbing and bending become violent to damage the cable and the like for a short period of time and wear particles are generated to make the cleanness of use or installation environment worse.

Further, in a conventional cable and the like protection and guide device described in Patent Reference 2, since an elastic connecting member is bent or articulated together with a link body, the curvature of a bent portion is reduced and becomes an edge. Thus, since the tip of a small bent portion contacts the cable and the like and is supported thereby, the cable and the like had the possibility of rub-damaged. Further, since the material of the elastic connecting member is limited, the cable and the like are liable to rub-damaged by the material. Particularly, in a case where the cable and the like protection and guide device is operated at high speed and high frequency, there were problems that the cable and the like are slid on the elastic connecting body violently and rubbing damage becomes violent so that they wear for a short period of time and wear particles are generated to make the cleanness of use or installation environment worse.

The objects of the present invention are to solve the above-mentioned related art problems and to provide a cable and the like protection and guide device, which can prevent the generation of rubbing damage and wear particles in the cable and the like.

Means for Solving the Problems

To attain the above-mentioned object, a cable and the like protection and guide device according to claim 1, in which a plurality of link bodies are articulably connected to each other in the longitudinal direction in a state where said cable and the like was inserted into said device, each link body comprising a pair of side plates disposed on both sides of the cable and the like and connecting rods spanned across a bending outer circumferential side and a bending inner circumferential side of said side plate respectively, is characterized in that a cable protecting sheet is disposed on at least one of a bending outer circumferential side and a bending inner circumferential side in said link bodies along the longitudinal direction of the cable and the like.

The cable and the like protection and guide device according to claim 2 is characterized in that in claim 1, a cable separating sheet, which separates the internal space of the link body into plural parts, is further disposed between one remaining side of said bending outer circumferential side and a bending inner circumferential side in said link bodies.

The cable and the like protection and guide device according to claim 3 are characterized in that in claim 1 or 2, respectively, at least one of said cable protecting sheet and said cable separating sheet is supported by both ends members through a sheet length adjusting mechanism, which follows the bending operation of the link bodies.

Action

According to the cable and the like protection and guide device according to claim 1, a cable protecting sheet is disposed on at least one of a bending outer circumferential side and a bending inner circumferential side in the link bodies along the longitudinal direction of the cable and the like. Consequently, the contact surface pressure between the cable and the like and the outer circumferential side connecting rod or the inner circumferential side connecting rod is reduced. Thus, even if they are operated at high speed and high frequency, rub-damage and wear particles of the cable and the like are not generated, or even if generated, they are extremely small.

According to the cable and the like protection and guide device according to claim 2, a cable separating sheet, which separates the internal space of the link body into plural parts, is further disposed between one remaining side of said bending outer circumferential side and a bending inner circumferential side in said link bodies. Consequently, in a case where the cables and the like are disposed in the link bodies in multiple stages, the cables and the like forming the respective stages are disposed in spaces formed by the cable or the like separating sheets. Consequently, the contact surface pressure between the cables and the like forming the respective stages is reduced, and even if they are operated at high speed and high frequency the generation of the rub-damage and wear particles is prevented.

According to the cable and the like protection and guide device according to claim 3, at least one of said cable protecting sheet and the cable separating sheet is supported by both ends members through a sheet length adjusting mechanism, which follows the bending operation of the link bodies. Consequently, when the link bodies are in a bending state or in a linear state, the cable-protecting sheet follows the cable and the like and are not subjected to tension or a compressive load.

The invention will be better understood when reference is made to the BRIEF DESCRIPTION OF THE DRAWINGS, DETAILED DESCRIPTION OF THE INVENTION and CLAIMS which follow hereinbelow.

A better understanding of the invention will be had when reference is made to the DETAILED DESCRIPTION OF THE INVENTION and CLAIMS which follow hereinbelow.

DETAILED DESCRIPTION OF THE INVENTION

Embodiments of the Invention

Examples of a cable and the like protection and guide device according to the present invention will be described hereinbelow with reference to drawings.

FIGS. 1 to 4 show a first example of a cable and the like protection and guide device according to the present invention.

This cable and the like protection and guide device comprise a plurality of link bodies 11. These link bodies 11 are arranged in a row and are articulably connected to the respective adjacent link bodies 11. The cables and the like 12 are inserted into these link bodies 11.

Each of the link bodies 11 has side plates 21 and connecting rods 22, 23. The side plates are disposed in parallel with a space. A connecting rod 22 (referred to as an inner circumferential side connecting rod to differentiate from the other) is disposed between the side plates 21 so as to span across the inner circumferential side of the side plates 21. The an inner circumferential side connecting rod 22 and the side plates 21 are made of a plastic molded product and are integrally injection-molded. A connecting rod 23 (hereinafter referred to as an outer circumferential side connecting rod) is also made of a plastic molded product, and is disposed between the side plates 21 so as to span across the bending inner circumferential side of the side plates 21. However, this an outer circumferential side connecting rod 23 is removably attached to the side plates 21.

The side plate 21 has a cocoon shape when viewed from the side. A front portion of the side plate 21 is provided with a pin hole 25. On the other hand on a rear portion of the side plate 21 is integrally formed a pin having a diameter corresponding to the pin hole 25. The front inside surfaces of the side plates 21 are provided with stepped walls 27. The rear edge of the stepped wall 27 forms a narrow cylindrical surface or an arc surface having the center axis in common with the pin hole 25. The rear outside surfaces of the side plates 21 are provided with stepped walls 28. The front edge of the stepped wall 28 forms a narrow cylindrical surface having the center axis in common with the pin hole 26. The distance between the inside surfaces of the stepped walls 27 is slightly wider than the distance between the outside surfaces of the step walls 28.

The respective link bodies 11 are connected to each other by fitting the stepped walls 27 of each link body 11 on the stepped walls 28 of the adjacent front link body 11 and fitting the pin hole 25 onto the pin 26 of the front adjacent link body 11 and by fitting the stepped walls 28 of each link body 11 onto the stepped wall 27 adjacent to adjacent link bodies and fitting the pin 26 into the pin hole 25 of the adjacent link body 11. Accordingly, each link body 11 is capable of pivoting or articulating about the pin 26 with respect to the adjacent link body 11.

Figure 1:
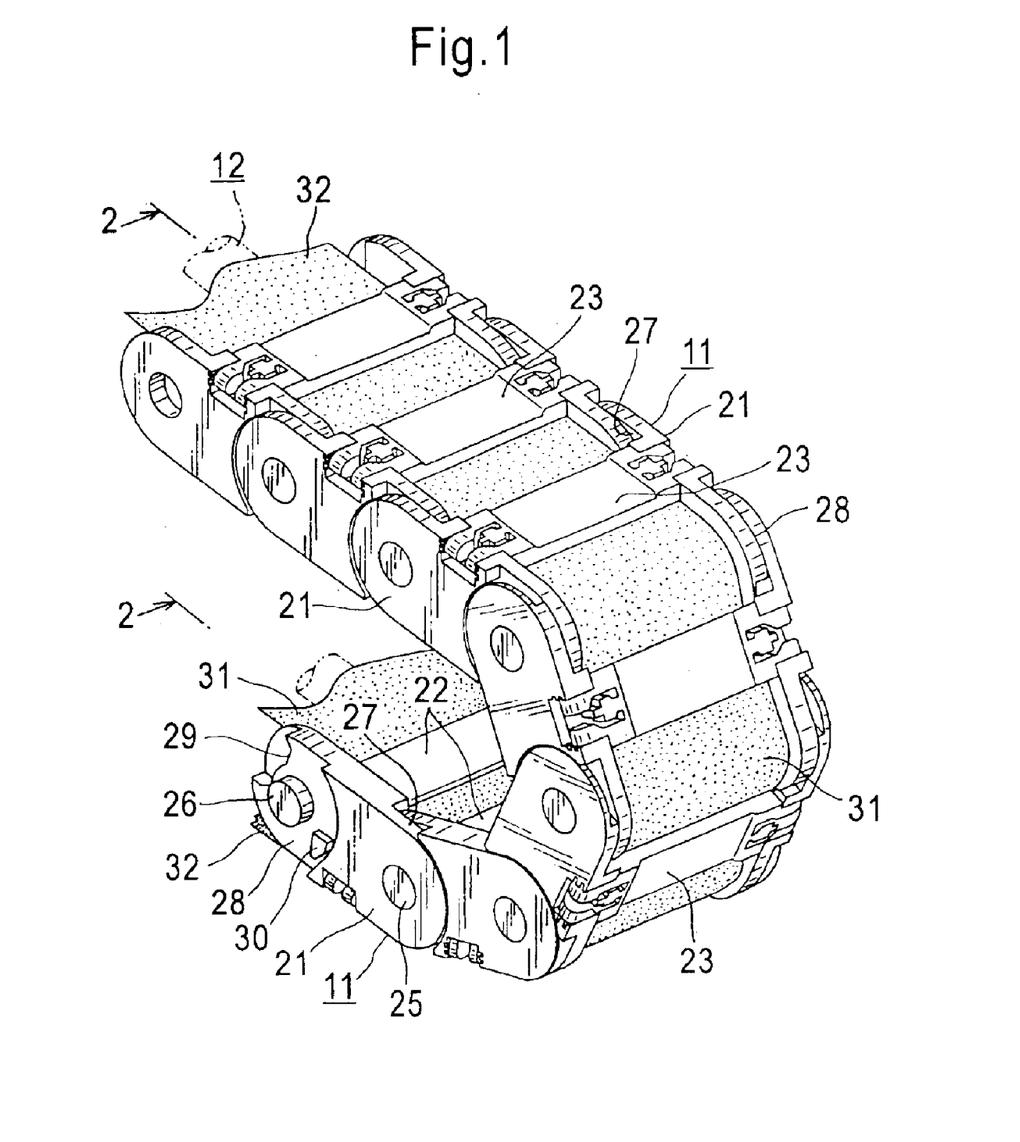
FIG. 1 is a perspective view showing a first example of a cable and the like protection and guide device according to the present invention.

On the respective link bodies 11 are incorporated a mechanism for limiting a bend angle. This bend angle limiting mechanism has the same configuration as that described in the specification of Japanese patent 3127491. That is when the link bodies are in a liner state, an arrow-shaped protrusion on the stepped wall 27 of the side plate 21 in a link body 11 contacts one end surface of a fun-shaped recess on the stepped wall 28 of the side plate 21 in an adjacent link body 11, and a flat limiting surface on a rear end of the stepped wall 28 contacts a hook-shaped protrusion on the stepped wall 28 of the side plate 21 in a front adjacent link body 11. When the link bodies 11 are in a bend state, arrow-shaped protrusions on the stepped walls 27 forming front inner surfaces of the side plates 21 in the link bodies 11 contact end surfaces opposite to the recesses on the stepped walls 28 of the side plates 21 in an adjacent link bodies 11. In this case, only the recess 29 and the hook-shaped protrusion 30 on the stepped wall 28 are shown in FIG. 1.

Figure 2:
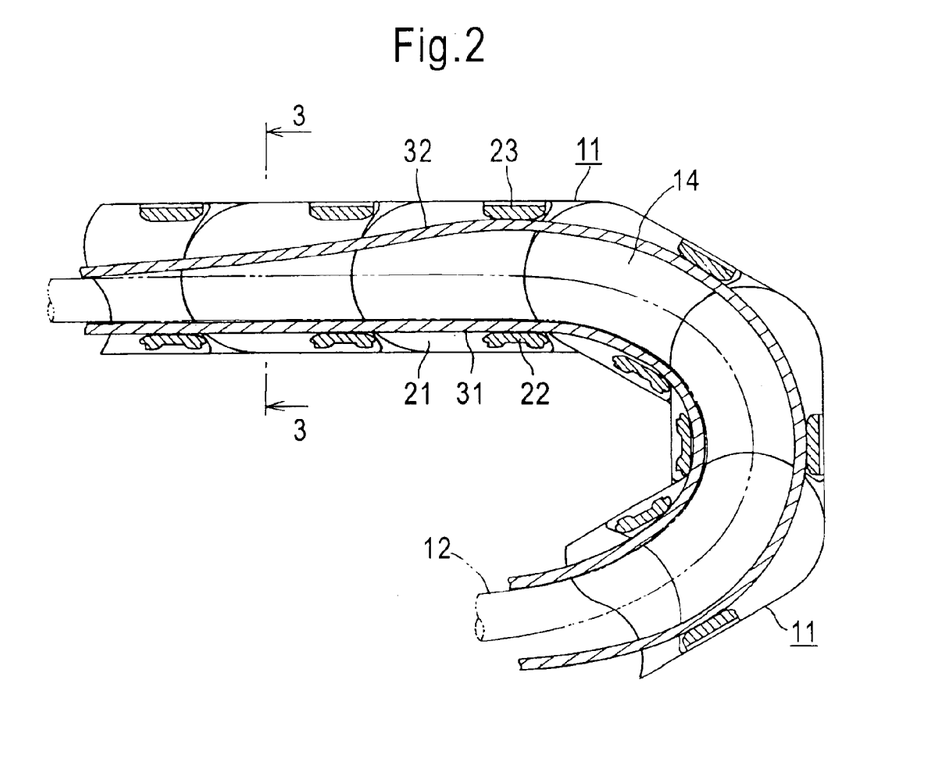
FIG. 2 is a vertical sectional view taken along the line 2—2 in FIG. 1.
Figure 3:
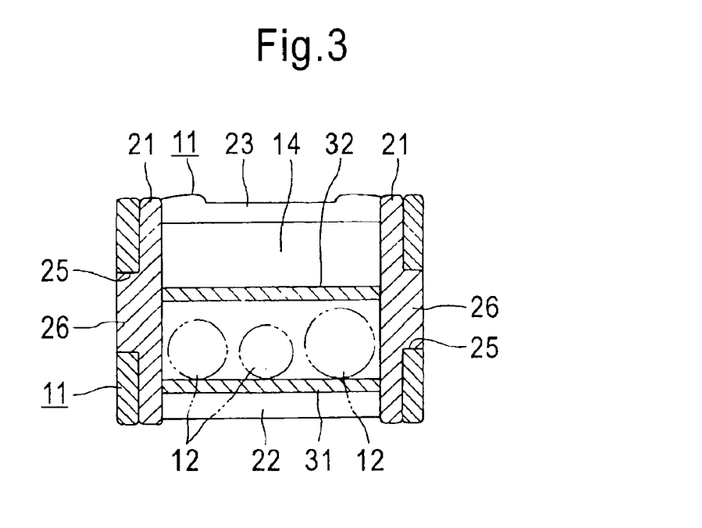
FIG. 3 is a cross-sectional view taken along the line 3—3 in FIG. 2.

The cable and the like 12 are disposed in an inner space of each link body 11 in a sandwiched manner between cable protecting sheets 31, 32. These cable protecting sheets 31, 32 are respectively composed of a flexible sheet, which has width corresponding to distance between side plates 21, forms a band shape extending along the longitudinal direction of the cable and the like 12, has a small friction coefficient with respect to the cable and the like 12 and has small wear even if rubbed against the cable and the like 12.

The cable protecting sheet 31 is positioned between the cable and the like 12 and the inner circumferential side connecting rod 22 and is disposed in the inner space 14 of the link bodies 11. The cable protecting sheet 32 is positioned between the cable and the like 12 and the outer circumferential side connecting rod 23 and is disposed in the inner space 14 of the link bodies 11. Both ends of the cable protecting sheets 31 and 32 are movably connected in their longitudinal direction to both link bodies 11 on both ends of this cable and the like protection and guide device and a movable end fitting and fixed end fitting connected to the both link bodies 11.

In this cable and the like protection and guide device a cable (or cables) and the like such as a power cable, which connects between a movable portion and a stationary portion of a machine tool, and a hose, which supplies cutting liquid, are inserted. The cable and the like protection and guide device protects this cable and the like and is used for expanding or contracting the cable and the like in accordance with the movement of the movable portion.

The incorporation of the cable and the like 12 into the protection and guide device are performed by opening the outer circumferential side connecting rods 23 of all link bodies 11, inserting a cable protecting sheet 31 in the inner space of the respective link bodies 11 while contacting an inner circumferential side connecting rod 22, putting a cable protecting sheet 32 on the cable and the like 12 and closing the outer circumferential side connecting rod 23. When incorporated, the cable protecting sheet 32 is flexed and closely adhered to the cable and the like 12 and supports the cable and the like 12 across the all length thereof with a wide area. The mounting of the cable and the like protection and guide device on a machine tool is performed by pin-connecting movable end fitting and fixed end fitting 15 on the link bodies on both ends of the device, fixing the movable end fitting to a movable portion of the machine tool and the fixed end fitting to a stationary portion thereof and is connected to the earth through the movable end fitting or fixed end fitting.

When the movable portion of the machine tool is moved, the link bodies are in a bending state or in a linear state. The cable(s) and the like 12 are bent or articulated or in a linear state while contacting the cable protecting sheet 31 or the cable protecting sheet 32 or both of them in accordance with the state of the link bodies 11 in the link bodies 11. Then substantially the all length of the cable and the like 12 are not only supported by the cable protecting sheet 31 and 32 but also they contact the inner circumferential side connecting rod 22 through the cable protecting sheet 31 and the outer circumferential side connecting rod 23 through the cable protecting sheet 32. Further, these cable protecting sheets 31 and 32 are bent while keeping a flexible curvature to closely adhere to the cable and the like 12 so that the contact surface pressure between the cable and the like 12 and the inner circumferential connecting rod 22 and the contact surface pressure between the cable and the like 12 and the outer circumferential connecting rod 23 are reduced. Consequently, rubbing damage is not generated in the cable and the like 12 and it is extremely small even if generated. Even if wear particles are generated, since the cable and the like 12 are tightly closed by the side plates 21 and the cable protecting sheets 31 and 32, the wear particles do not scatter outside.

In the cable and the like protection and guide device according to the present invention, since the cable protecting sheets 31 and 32 are comprised of members independent of the link bodies 11, they can be changed in accordance with the material of the cable and the like 12 or a use environment. For example, by using a material having a small surface friction coefficient with the cable and the like 12 as a material of the cable protecting sheet 31, a cable and the like protection and guide device, which is not rub-damaged in the cable and the like 12 even if operated at high speed and high frequency, can be obtained easily and at low cost. Further, by using cable protecting sheets, which contain an electric conducting filler such as carbon black or carbon fiber or the like, even if static electricity is generated when the link bodies 11 and the cable and the like 12 were bent or in a linear state, the static electricity is escaped to the earth through the link bodies 11 and the cable protecting sheets 31 and 32. Consequently since static electricity discharge is not generated, the cable and the like can be closed tightly and then a cable and the like protection and guide device, which is applied to a machine, which is disposed at a place where ignition by discharge due to static electricity and breakage are to be avoided, can be obtained.

Further, in this cable and the like protection and guide device, the cable protecting sheets 31 and 32 are connected to the movable end fitting and the fixed end fitting through a sheet length adjusting mechanism, and when the link bodies were bent and in a linear state, the cable protecting sheets 31 and 32 are not subjected to tension or a compressive load.

Figure 4:
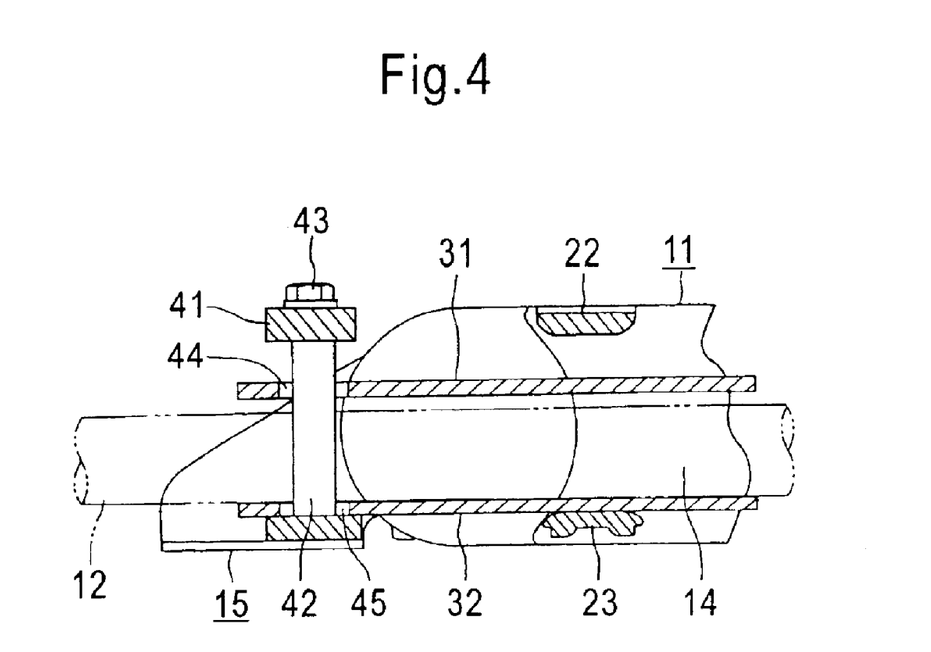
FIG. 4 is a vertical sectional view of a cable length adjusting mechanism with respect to the cable and the like protection and guide device of the present invention.

FIG. 4 shows such a sheet length adjusting mechanism positioned on a side of fixed end fitting. The fixed end fitting is denoted by the reference numeral 15. This fixed end fitting 15 is well known, and is connected to the link bodies 11 positioned on a lower side end portion shown in FIG. 1. The connection between the fixed end fitting 15 and the link bodies 11 are performed by fitting a pin in the fixed end fitting 15 to pin holes in the respective side plates 21 of the link bodies 11 on the rear end. Then the fixed end fitting 15 is articulable about this pin. A cramp 41 is composed of a U-shaped member in a cross-section in the vertical direction in FIG. 4 and is spanned across the fixed end fitting 15. The lower member of the cramp 41 is connected to the fixed end fitting 15. One end of a shaft member 42 is fixed to a lower piece of the cramp 41, and the other end of the shaft member 42 penetrates an upper piece of the cramp 41. A nut 43 is screwed on a threaded portion of an end portion of the upper piece of the shaft member 42, which protruded through the upper piece of the cramp 41. The cable protecting sheets 31 and 32 include sheet length adjusting elongated holes 44 and 45 extending in the longitudinal direction of this device at their end portions, respectively. The sheet length adjusting elongated holes 44 and 45 are fitted to the shaft member 42. Movable end fittings sides of the cable protecting sheets 31 and 32 are connected to the movable end fittings connected to the opposite ends by a sheet length adjusting mechanism constructed in the same manner.

Since such a sheet length adjusting mechanism moves the cable protecting sheets 31 and 32 along the sheet length adjusting elongated holes 44 and 45 in the longitudinal direction during bending the link bodies, the cable protecting sheets 31 and 32 are not subjected to tension or compression load at all. Thus, the endurance of the cable protecting sheets 31 and 32 is enhanced and even a material such as a plastic or a metallic plate having small elongation or elasticity can be used as a cable protecting sheet.

Figure 5:
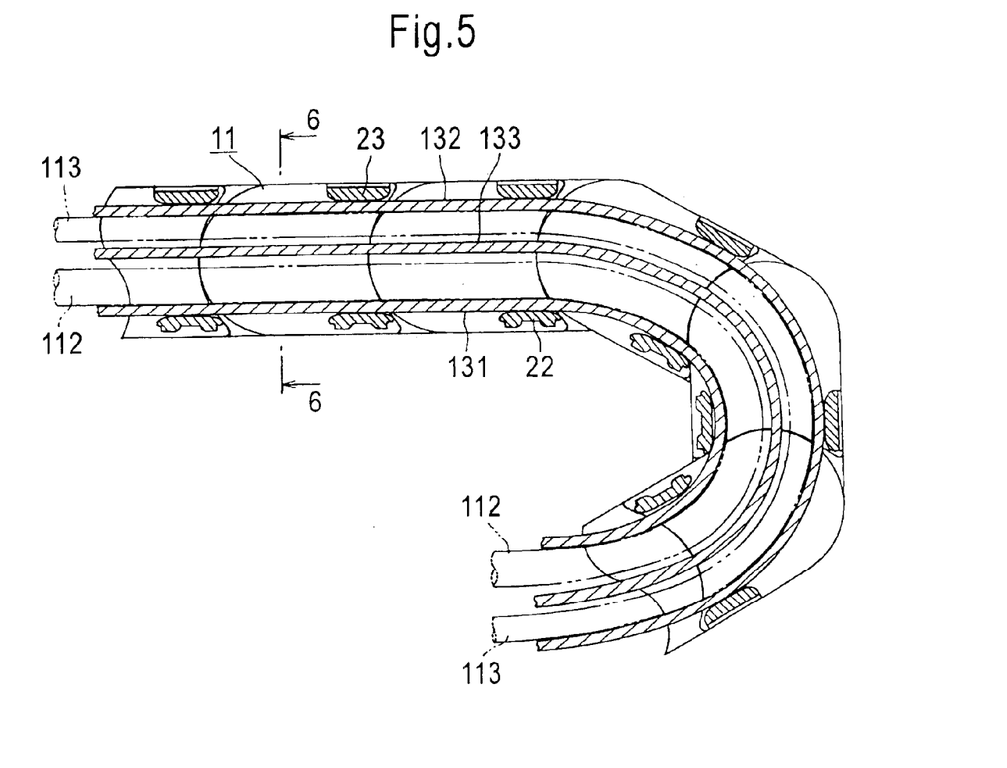
FIG. 5 is a vertical sectional view showing a second example of a cable and the like protection and guide device according to the present invention.
Figure 6:
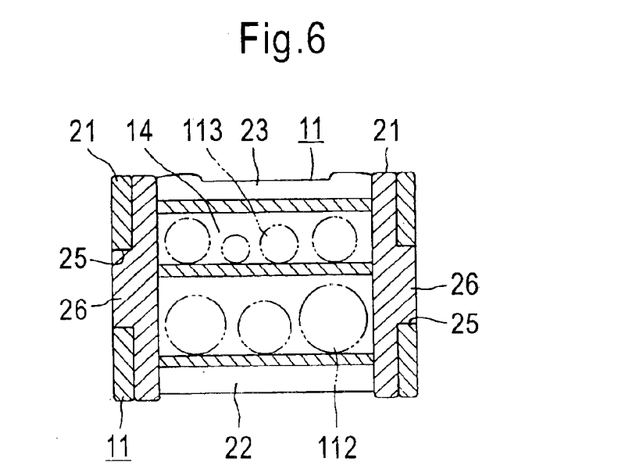
FIG. 6 is cross-sectional view taken along the line 6—6 in FIG. 5.
Figure 7:
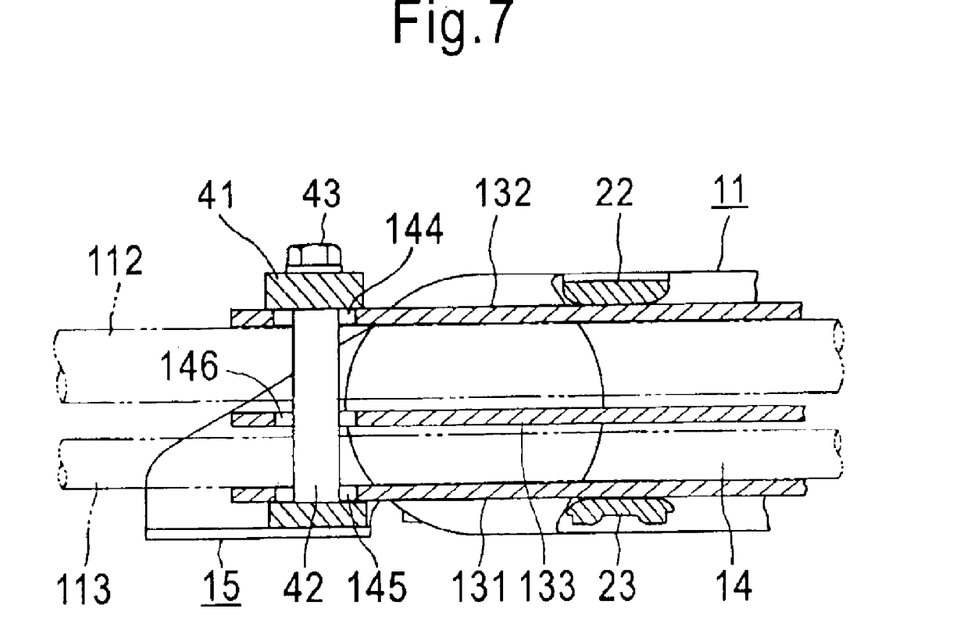
FIG. 7 is a vertical sectional view showing a configuration of the cable length adjusting mechanism in the cable and the like protection and guide device shown in FIG. 2

FIGS. 5 to 7 show second Example of a cable and the like protection and guide device according to the present invention.

In this cable and the like protection and guide device, a number of link bodies 11 are arranged in a raw, adjacent link bodies 11 are pin-connected to each other and a bend angle or articulation angle is limited by a mechanism between link bodies like the cable and the like protection and guide device explained in relation to FIGS. 1 to 4.

However, in this cable and the like protection and guide device, as shown in FIGS. 5 and 6, cable protecting sheets 131 and 132 and a cable separating sheet 133 are incorporated in the link bodies 11. Each of these sheets 131 to 133 has a width corresponding to a distance between a side plate 21 and is in an elongated form extending along the longitudinal direction of the link body 11. Further it is composed of materials having electrical conductivity and small frictional coefficient and wear to the cable and the like 12, for example a plastic such as a ultra polymer polyethylene resin containing a electric conducting filler such as carbon black or carbon fiber or the like.

The cable protecting sheet 131 is positioned between a cable and the like 112 and an inner circumferential side connecting rod 22 to be inserted into the link bodies 11. On the other hand, the cable protecting sheet 132 is positioned between an outer circumferential side connecting rod 23 and a cable and the like 113 to be inserted into the link bodies 11. Further, the cable separating sheet 133 is positioned between the cable protecting sheets 131 and 132 and is accommodated in the link bodies 11. The sheets 131 to 133 part the internal space 14 of the link bodies 11 and the cables and the like 112 and 113 are inserted into the two spaces parted by the cable separating sheet 133, respectively.

Both ends of the respective cable protecting sheets 131 and 132 and cable separating sheet 133 are connected to a movable end fitting and a fixed end fitting through the same sheet length adjusting mechanism as in the above-mentioned example as shown in FIG. 7. A cramp 41 has a U-shape, and is spanned across the fixed end fitting 15. Further, the lower piece of the cramp 41 is connected to the fixed end fitting 15. One end of a shaft member 42 is connected to the lower piece of the cramp 41. A nut 43 is screwed on an end portion of the shaft member 42, extending from the upper piece of the cramp. The cable protecting sheets 131 and 132 and the cable separating sheet 133 include sheet length adjusting elongated holes 144, 145 and 146 extending in the longitudinal direction of this device at their end portions, respectively. The sheet length adjusting elongated holes 144 to 146 are fitted to the shaft member 42. Fixed end fittings sides of the cable protecting sheets 131 and 132 and the cable separating sheet 133 are connected to the movable end fittings connected to the opposite ends by a sheet length adjusting mechanism constructed in the same manner.

In this cable and the like protection and guide device, when the link bodies 11 were in a bent state or a linear state, substantially the all length of the cables and the like 112 and 113 are supported by the cable protecting sheets 131 to 133. Also the cable and the like 112 contacts the inner circumferential connecting rod 22 through the cable protecting sheet 131, the cable and the like 113 contacts the outer circumferential connecting rod 23 through the cable protecting sheet 132. Further, the cable and the like 112 contact the cable and the like and 113 through the cable separating sheet 133. In this case since the contact surface pressure is small, even if the link bodies 11 are in a bent state and a linear state, rubbing damage in the cables and the like 112 and 113 does not occur and wear particles are not generated. Further, when the link bodies 11 were in a bent state or a linear state, the sheets 131 to 133 are moved in the longitudinal direction along the sheet length adjusting elongated holes 144 to 146 respectively and are not subjected to tension and compression load. Thus they have excellent durability. Further, static electricity generated in the link bodies 11 and cables and the like 112 and 113 escapes to the earth through the cable protecting sheets 131 and 132, the cable separating sheet 133 and the link bodies 11 and no static electricity discharge is not generated whereby there are no possibilities of ignition and static electricity breakage of other devices.

It is noted that in the above-described examples, although a case was described where the cable protecting sheets 31 and 131 are disposed between the cable and the like 12 and the inner circumferential side connecting rod 22, the cable protecting sheets 32 and 132 are disposed between the cable and the like 12 and the outer circumferential side connecting rod 23 and the cable and the like 12 are rubbed with the both connecting rods 22 and 23, the cable protecting sheets may be disposed only between the cable and the like 12 and the inner circumferential side connecting rod 22, or only between the cable and the like 12 and the outer circumferential side connecting rod 23.

Further, when the link bodies 11 were moved, the cable length adjusting mechanism causes the cable protecting sheets 31, 32 and 131 to 133 to move in the longitudinal direction by the sheet adjusting elongated holes 44, 45 and 144 to 146 so that the cable protecting sheets 31, 32 and 131 to 133 are not subjected to a load and the difference between lengths is absorbed. However, another floating supporting means, in which the respective cable protecting sheets are connected to both ends members through springs respectively, may be adopted.

Additionally, each link body 11 is pin-connected to adjacent link bodies and is bent by pivoting about a pin. However, such bending or articulation is not limited such pin connection. For example, the link bodies may be connected to each other by elastic connecting members such as lanyards or strips so that the bending of the elastic connecting members may be performed by the elastic connecting members. Alternatively, a part of the side plate 21 of each link body 11 is pivotally fitted to a part of the side plate of the adjacent link body so that the link bodies may be bent or articulated about a fitting portion.

Effects of the Invention

As described above, in a cable and the like protection and guide device of claim 1, in which a plurality of link bodies are articulably connected to each other in the longitudinal direction in a state where the cable and the like was inserted into said device, each link body comprising a pair of side plates disposed on both sides of the cable and the like and connecting rods spanned across a bending outer circumferential side and a bending inner circumferential side of the side plate respectively, a cable protecting sheet is disposed on at least one of a bending outer circumferential side and a bending inner circumferential side in said link bodies along the longitudinal direction of the cable and the like. Accordingly, the contact surface pressure between the cable and the like and the outer circumferential side connecting rod or the inner circumferential side connecting rod is reduced. Thus, even if they are operated at high speed and high frequency, since the generation of damage and wear particles of the cable(s) becomes minimum, the endurance and reliability of the cable and the like protection and guide device of the present invention are high. As a result the device of the present invention can be applied to the installation and use environment, which is required for cleanness. Further, only by changing the cable protecting sheet the cable and the like protection and guide device of the present invention can be applied to cables and the like having various materials. Thus the wear particles do not disperse outside and the device of the present invention can be used in various fields at low cost.

According to the cable and the like protection and guide device according to claim 2, a cable separating sheet, which separates the internal space of the link body into plural parts, is further disposed between one remaining side of the bending outer circumferential side and the bending inner circumferential side in the link bodies and cable(s) and the like are accommodated in respective spaces formed by the cable separating sheets whereby the contact surface pressure between the cables and the like accommodated in the respective spaces is reduced. Thus even in a case where the cables and the like are arranged at multi-steps, the generation of damage and wear particles of the cable(s) can be made minimum.

According to the cable and the like protection and guide device according to claim 3, at least one of the cable protecting sheet and the cable separating sheet is supported by both ends members through a sheet length adjusting mechanism, which follows the bending operation of the link bodies. Thus, when the link bodies were in a bent state or a linear state, the cable protecting sheets or cable separating sheet follow the cables and the like and they are not subjected to tension and a compression load so that further excellent endurance and reliability can be obtained.

[Description of Reference Numerals]
11 . . . Link body
12, 112, 113 . . . Cable(s) and the like
14 . . . Internal space
15 . . . Fixed end fitting
21 . . . Side plate
22 . . . Inner circumferential side connecting rod
23 . . . Outer circumferential side connecting rod
25 . . . Pin hole
26 . . . Pin
31, 32, 131, 132 . . . Cable protecting sheet
41 to 45, and 144 to 146 . . . Sheet length adjusting mechanism
133 . . . Cable separating sheet.

The invention has been described by way of example only and those skilled in the art will readily recognize that certain changes and modifications may be made to the examples without departing from the spirit and scope fo the appended claims.

We claim:

1. A cable protection and guide device in which a plurality of link bodies are articulably connected to each other in the longitudinal direction in a state where said cable was inserted into said device, each link body comprising a pair of side plates disposed on both sides of the cable and connecting rods spanned across a bending outer circumferential side and a bending inner circumferential side of said side plate respectively, characterized in that a cable protecting sheet is disposed on at least one of a said bending outer circumferential side and said bending inner circumferential side in said link bodies along the longitudinal direction of the cable, and, said cable protecting sheet is supported by end fitting members through a sheet length adjusting mechanism, which follows the bending operation of the link bodies.

2. A cable protection and guide device in which a plurality of link bodies are articulably connected to each other in the longitudinal direction in a state where said cable was inserted into said device, each link body comprising a pair of side plates disposed on both sides of the cable and connecting rods spanned across a bending outer circumferential side and a bending inner circumferential side of said side plate respectively, characterized in that a cable separating sheet, which separates the internal space of the link body into plural parts, is further disposed between one remaining side of said bending outer circumferential side and a bending inner circumferential side in said link bodies, and, said cable separating sheet is supported by end fitting members through a sheet length adjusting mechanism, which follows the bending operation of the link bodies.

3. A cable protection and guide device in which a plurality of link bodies are articulably connected to each other in the longitudinal direction in a state where said cable was inserted into said device, each link body comprising a pair of side plates disposed on both sides of the cable and connecting rods spanned across a bending outer circumferential side and a bending inner circumferential side of said side plate respectively, characterized in that cable protecting sheet are disposed on said bending outer circumferential side and said bending inner circumferential side of said link bodies along the longitudinal direction of the cable, a cable separating sheet, which separates the internal space of the link body into plural parts, is further disposed between said bending outer circumferential side and said bending inner circumferential side in said link bodies, and, said cable protecting sheets and said cable separating sheet are supported by end fitting members through a sheet length adjusting mechanism, which follows the bending operation of the link bodies.

* * * * *

UNITED STATES PATENT AND TRADEMARK OFFICE
CERTIFICATE OF CORRECTION

PATENT NO. : 6,984,782 B2
DATED : January 10, 2006
INVENTOR(S) : Ikeda et al.

It is certified that error appears in the above-identified patent and that said Letters Patent is hereby corrected as shown below:

<u>Column 10,</u>
Line 8, after "of" and before "said" delete "a".
Line 41, after "protecting" delete "sheet" and insert -- sheets --.

Signed and Sealed this

Eighteenth Day of April, 2006

JON W. DUDAS
*Director of the United States Patent and Trademark Office*